Nov. 5, 1935.  H. L. WEED  2,020,089

INTERNAL COMBUSTION ROTARY ENGINE

Filed April 25, 1932   6 Sheets-Sheet 1

Inventor:
Howard L. Weed
by Martin P. Smith
Attorney

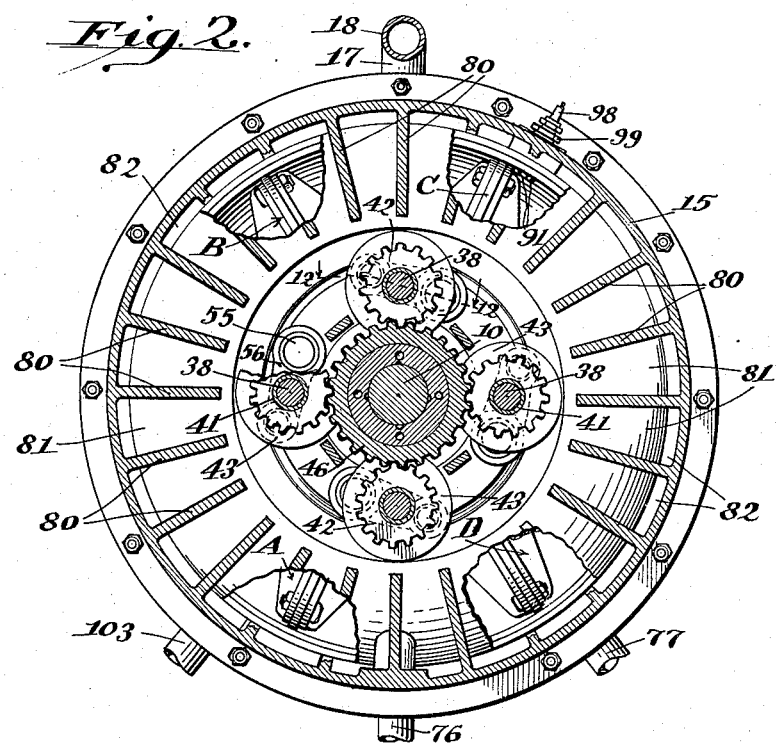
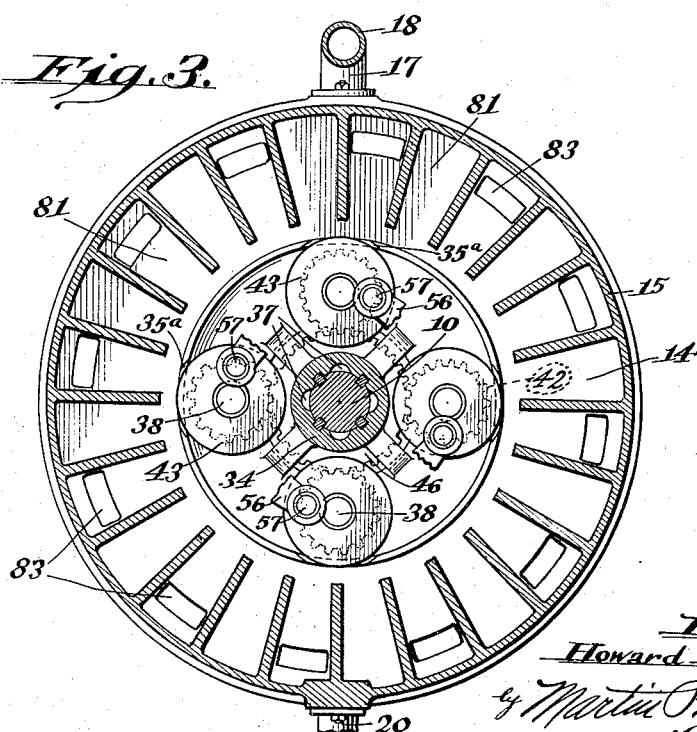

Nov. 5, 1935. H. L. WEED 2,020,089
INTERNAL COMBUSTION ROTARY ENGINE
Filed April 25, 1932  6 Sheets-Sheet 3

Inventor
Howard L. Weed
By Martin P. Smith
Attorney

Nov. 5, 1935.  H. L. WEED  2,020,089
INTERNAL COMBUSTION ROTARY ENGINE
Filed April 25, 1932   6 Sheets-Sheet 4

Inventor:
Howard L. Weed.
By Martin (Smith)
Attorney.

Nov. 5, 1935.       H. L. WEED          2,020,089
INTERNAL COMBUSTION ROTARY ENGINE
Filed April 25, 1932      6 Sheets-Sheet 5

Inventor
Howard L. Weed
By Martin P. Smith
Attorney.

Nov. 5, 1935.  H. L. WEED  2,020,089
INTERNAL COMBUSTION ROTARY ENGINE
Filed April 25, 1932   6 Sheets-Sheet 6

Inventor
Howard L. Weed
By Martin P. Smith
Attorney

Patented Nov. 5, 1935

2,020,089

UNITED STATES PATENT OFFICE 2,020,089

INTERNAL COMBUSTION ROTARY ENGINE

Howard L. Weed, Los Angeles, Calif.

Application April 25, 1932, Serial No. 607,337

19 Claims. (Cl. 123—11)

My invention relates to an internal combustion rotary engine of the same general type as disclosed in U. S. Letters Patents issued to me and my assignee as follows:
1,298,838 issued April 1st, 1919; 1,298,839 issued April 1st, 1919; 1,328,410 issued January 20, 1920; 1,348,675 issued August 3, 1920; 1,476,784 issued December 11, 1923; and 1,726,461 issued August 27, 1929.

The principal object of my present invention is, to generally improve upon and simplify the construction of the engines disclosed in my above mentioned patents as well as other similar forms of engines operating on the internal combustion principle and employing a plurality of pairs of pistons that travel constantly in the same direction but at varying speeds.

Further objects of my invention are, to provide improved means for lubricating the moving parts of the engine and to utilize the cooling effect of a circulation of air for the purpose of cooling the liquid lubricant that circulates through the engine, thus maintaining the lubricant at practically uniform temperature so as to exert a uniform cooling effect upon all parts of the engine and thereby counteracting any tendency of distortion of the engine parts, due to uneven expansion and contraction.

A further object is, to provide improved means for packing and producing fluid pressure sealed joints between the pistons and the circular chambers through which said pistons travel and further, to provide means whereby the piston rings that are carried by the pistons, are prevented from being forcibly moved radially outward under the influence of centrifugal forces and which action would otherwise result in the development of undue friction and wear between the piston rings and cylinder walls.

A further object of my invention is, to provide simple and efficient means whereby the air that is caused to flow through circular ducts within the engine housing and which absorbs heat from the liquid lubricant used for lubricating and cooling the engine, is taken directly to the carburetor that supplies the gaseous fuel to the engine, thus materially increasing the effectiveness of the carburetor and imparting to the same a supercharger effect and at the same time cooling the entire volume of liquid lubricant that is caused to circulate through the engine and equalizing the temperature of said liquid lubricant and exerting a cooling effect upon the entire engine.

Further objects of my invention are, to provide an improved arrangement of spark plugs for igniting the compressed gaseous fuel charges within the engine, said spark plugs being utilized in dual arrangement in order to insure ignition of the gaseous fuel charges, further, to provide means whereby the ignition chamber of each spark plug may be closed in order that the plugs may be individually removed for the purposes of changing, adjusting and cleaning, without interruption of the proper functioning of the other spark plug of each pair and further, to provide means including ducts that connect the ignition chambers with the annular cylinder chamber and the pistons that traverse said annular cylinder chamber for effectively accomplishing the exhaust or scavenging of burnt gases and products of combustion from the spark plug ignition chambers as well as from the main combustion chamber of the engine.

A further object of my invention is, to provide relatively simple and highly effective means for transmitting the motion and power from the rotors to the shaft of the engine, said means being arranged so as to utilize to the greatest advantage the power developed by the ignition and consequent expansion of the explosive charges between the pistons that travel continuously in the same direction but at different and variable speeds within the circular annular piston chamber.

A still further object of my invention is, to provide an effective liquid seal between the rotors and the annular cylinder within which the pistons operate and further, to provide means whereby centrifugal forces developed by the engine while in operation are utilized for effecting the flow of lubricating oil through the engine and particularly over and between the moving parts that require constant lubrication and cooling.

With the foregoing and other objects in view, my invention consists in certain novel features of construction and arrangement of parts that will hereinafter be more fully described and claimed and illustrated in the accompanying drawings in which:

Fig. 2 is a cross section on a reduced scale, on the line 2—2 of Fig. 1 with parts of the annular cylinder broken away.

Fig. 3 is a cross section on a reduced scale, on line 3—3 of Fig. 1.

Figure 1:
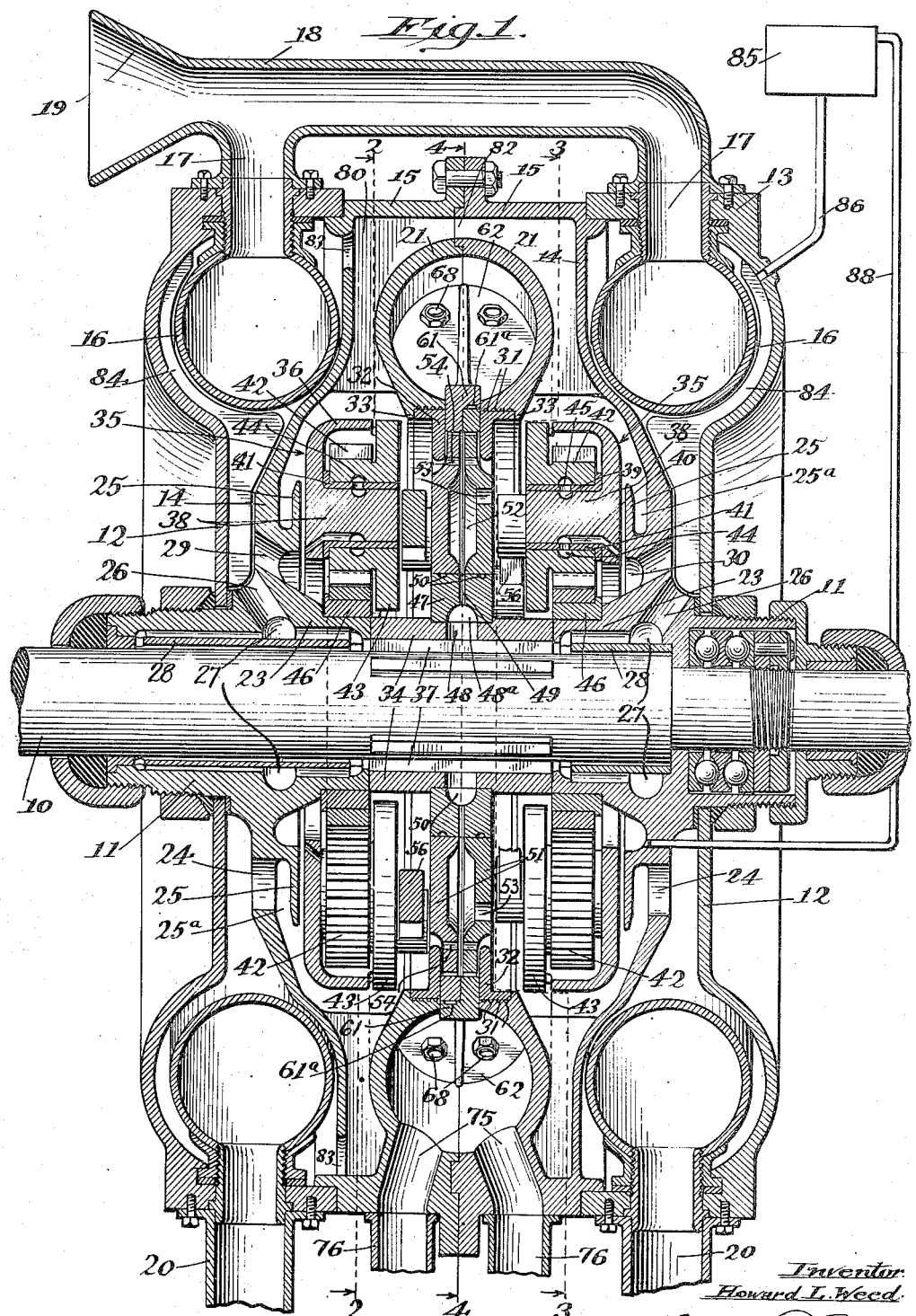
Fig. 1 is a vertical section taken through the center of the engine with the plane of said section intersecting the axis of the engine shaft.

Referring by numerals to the accompanying drawings which illustrate a practical embodiment of my invention, 10 designates the shaft of the engine that is journaled in suitable bearings 11.

Plates 12 form the outer end walls of the engine housing and formed integral with the outer edges of these walls are circumferential flanges 13, that project inwardly toward each other and the inner edges of these flanges are connected in any suitable manner to the outer edges of plates 14.

Formed integral with the edges of these plates 14 are circumferential flanges 15 that project toward each other and the abutting edges of these flanges are connected to each other in any suitable manner, preferably by means of bolts. Plates 14 carry the engine shaft bearings 11.

The two walls 14 and flanges 15, which are practically identical in construction, combine with each other and with the plates 12 in forming the engine housing. The inner housing member, comprising plates 14 and flanges 15, are divided on a medial line and the outer plates 12 are detachably connected to said inner housing member.

Arranged between the outer portions of the walls 12 and 14, are circular ducts 16, preferably formed of copper tubing and through which circulates air that is utilized for cooling and equalizing the temperature within the engine and particularly the lubricating oil thereof and the upper portions of these ducts are connected by branch ducts 17 to a horizontally disposed air intake pipe 18 having a flaring mouth 19.

Where the engine is utilized as the motive power for motor vehicles, airplanes and the like and the same are in motion, the pressure of all of the air entering the flaring mouth 19 of tube 18 and which air circulates through the tubes 16, produces a supercharger effect on the air that is heated during its passage through the engine and which finally passes to the carburetor.

Leading from the lower portions of the ducts 16 to the carburetor X that supplies the engine with gaseous fuel, are suitably arranged ducts 20.

Figure 9:
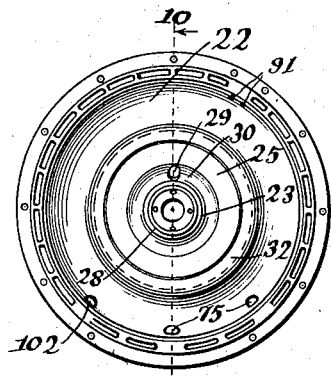
Fig. 9 is an elevational view of the inside face of one of the halves of the cylinder.
Figure 10:
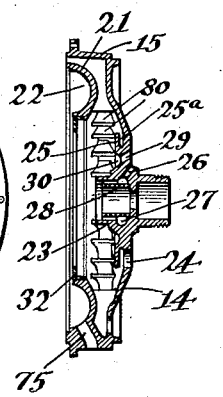
Fig. 10 is a vertical section taken on the line 10—10 of Fig. 9.
Figure 11:
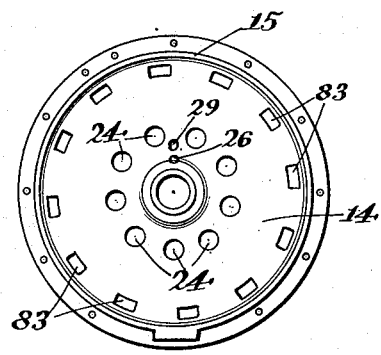
Fig. 11 is an elevational view looking against the outer face of the cylinder.

Formed integral with the inner portions of the walls 14, adjacent to the flanges 15, are circumferential walls 21, each semicircular in cross section and which, when the two parts of this housing are assembled, form a ring-shaped chamber 22, that is traversed by the pistons that are carried by the rotors of the engine. One of the inner parts of the engine housing which comprises a plate 14, flange 15 and circumferential wall 21, is illustrated in detail in Figs. 9, 10 and 11.

Formed integral with the central portion of each side wall 14, is a hub 23 and formed through the wall 14, adjacent to this hub, is a series of openings 24.

Formd integral with the inner portion of each hub 23, adjacent to the side wall 14 and projecting outwardly directly over the openings 24, but spaced apart therefrom, is an annular flange 25 and the narrow space 25ª between this flange and wall 14, constitutes an oil circulation chamber.

Formed through the hub of each housing member, is a port 26, the inner end of which communicates with a circular duct 27 that surrounds bushing 28 that is located around the opening in the housing member that receives the shaft 10 and leading from this duct 27 to the inner end of the hub 23 is a plurality of longitudinally disposed oil grooves 28.

Formed through the side wall 14 of each housing member, immediately adjacent to the port 26, is a port 29 and the inner end thereof communicates with an oil circulation groove 30, that is formed in the inner face of hub 23.

The inner ends of the cylinder walls are spaced apart for the accommodation of the outer portion of the rotors of the engine as hereinafter described and formed on the inner end of each cylinder wall, is a flat annular face, in which is formed a plurality of minute circumferential oil packing grooves 31.

Lying directly against these grooved faces are the outer portions of packing rings 32 that are substantially L-shaped in cross section and these packing rings are retained in proper position by flanges 33 that are formed on the outer portions of the cylinder walls and also by the outer portion of the rotors that project between the inner edges of said cylinder walls.

During operation of the engine, grooves 31 are filled with liquid lubricant, thus providing an effective packing to prevent leakage of fluid pressure between the inner edges of the cylinder walls and the outer portions of packing rings 32, and also to prevent leakage of oil into the annular piston chamber.

Figure 13:
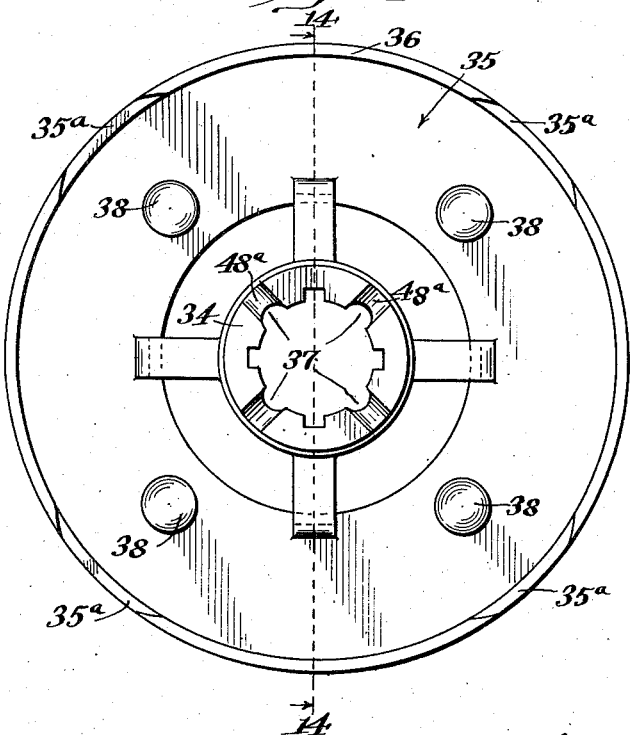
Fig. 13 is an elevational view of one of the main fly wheels of the engine.
Figure 14:
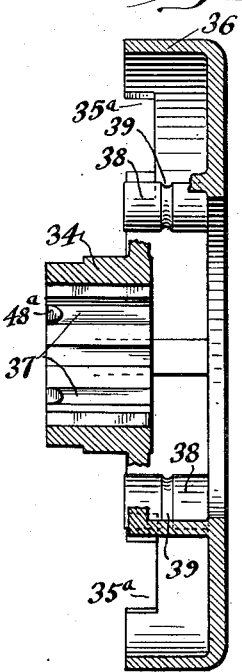
Fig. 14 is a vertical section taken on the line 14—14 of Fig. 13.
Figure 15:
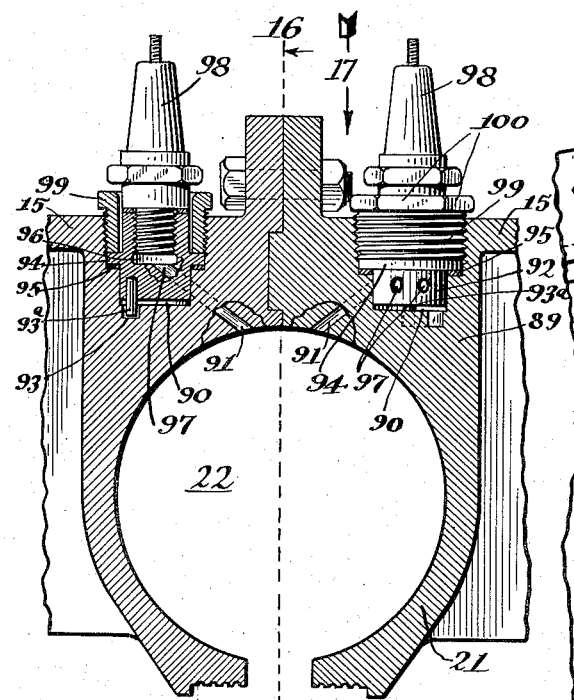
Fig. 15 is an enlarged detail section taken on the line 15—15 of Fig. 4.
Figure 16:
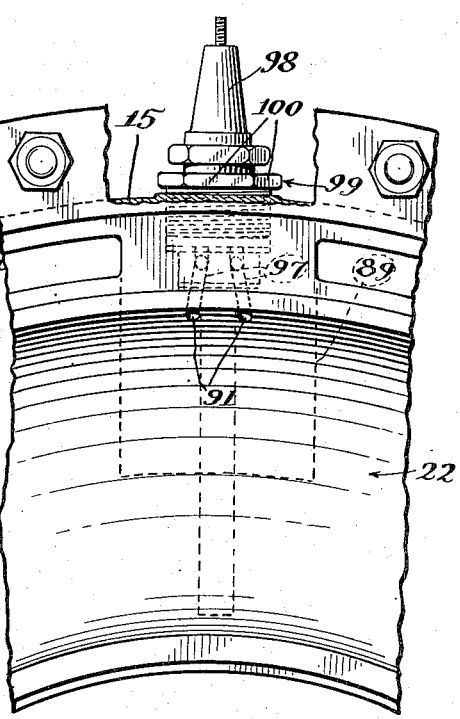
Fig. 16 is a vertical section taken on the line 16—16 of Fig. 15.
Figure 17:
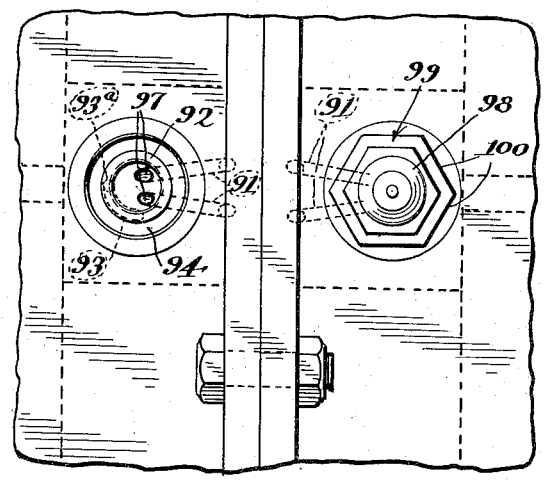
Fig. 17 is an elevational view taken looking in the direction indicated by the arrow 17 in Fig. 15.
Figure 18:
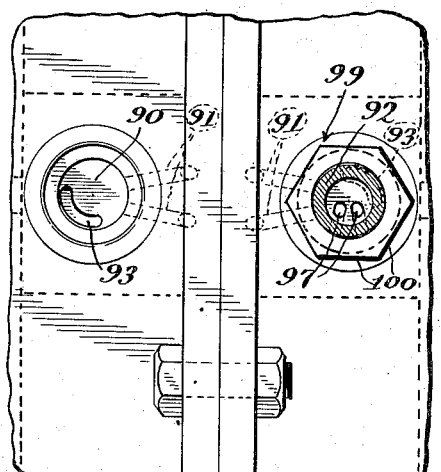
Fig. 18 is a horizontal section similar to Fig. 17 and showing the spark plug bushing that contains the ignition chamber in position so as to cut off communication with the piston chamber.

Secured in any suitable manner, for instance, by keys or splines, to shaft 10, are the hub portions 34 of fly wheels 35, which latter are spaced a suitable distance apart and formed on the edges of these fly wheels are circumferential flanges or rims 36. One of these fly wheels is illustrated in detail in Figs. 13 and 14.

Formed through the hub of each fly wheel and communicating with the opening that receives the shaft 10, is a series of longitudinally disposed oil ducts 37.

Formed integral with or fixed to the web of each fly wheel and projecting inwardly therefrom, is a series of studs or wrist pins 38 and formed in the periphery of each wrist pin, is a circumferential oil groove 39 and leading therefrom outwardly through the web of the fly wheel, is a duct 40.

The open outer ends of these ducts are disposed immediately adjacent to the duct 30 in the inner face of plate 14. Each stud 38 carries a bushing 41 and mounted for rotation on said bushing, is a pinion 42, with which is formed integral a small fly wheel 43. The flanges 36 of the large fly wheels are cut away as designated by 35ª for the accommodation of the peripheral portions of the small fly wheels 43.

Formed in the surface of the opening in pinion 42, that receives the stud and bushing, is a circumferential oil duct 44 that has communication with duct 39 through radial ducts 45 that are formed through bushing 41. As a result of this construction, liquid lubricant passes from duct 30 through ducts 40, thence through ducts 39 and 45 into duct 44 so as to effectively lubricate the bearings of the pinions 42 and small fly wheels 43 that are carried thereby.

The teeth of each set of pinions 42, mesh respectively with the teeth of ring gears 46 and which latter are secured in any suitable manner either by keys or splines to the hub portions 23 of the side walls 14.

The number of teeth on the pinions 46 is one-half the number of teeth on ring gears 46, thus providing the proper timing relation for the rotating parts of the engine.

Mounted on the abutting inner ends of the hubs 34 of the large fly wheels and clamped thereto so as to rotate therewith, is a ring 47, in the inner face of which is formed a circumferential oil groove 48 that is in communication with the oil grooves or ducts 37 through radial ducts 48 that are formed through the abutting ends of the hubs 34.

Formed through ring 47 and leading outwardly from duct 48, is a series of tangentially disposed ducts 49.

Formed in the outer face of ring 47 to the sides of the ducts 49, are circumferentially disposed oil packing grooves 50.

Mounted to rotate freely upon the periphery of ring 47, are the inner edges of a pair of ring-shaped plates 51 that constitute the rotors of my improved engine and the intermediate portions of these plates are spaced apart to form an oil circulation chamber 52, which latter has communication with the outer ends of the tangential ducts 49.

Formed through the plates 51 and leading outwardly from the chamber 52, are ports 53 that are preferably disposed in staggered relation and formed through the outer portions of said plates 51, just inside the packing rings 32, are ports 54. These ports are for the circulation of the oil that lubricates and cools the packing and rotors of the engine.

Projecting from each rotor plate 51, is a series of wrist pins 55 that correspond in number to the studs 38 and journaled on each wrist pin is one end of a connecting rod 56 and the opposite end of this rod is journaled on a crank pin 57 that projectst from the face of the adjacent fly wheel 43 at a point between the axis of said wheel and its periphery.

Figure 12:
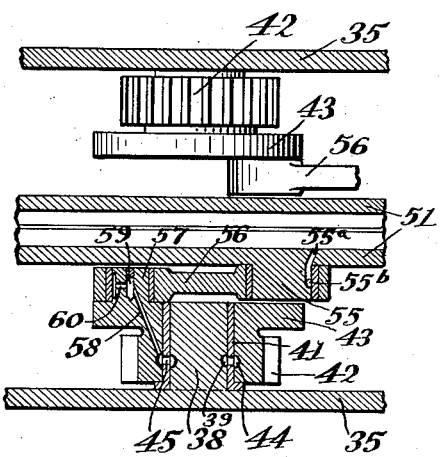
Fig. 12 is an enlarged cross section taken on the line 12—12 of Fig. 2.

The bearing surfaces between each connecting rod 56 and crank pin 57 are lubricated by means of oil which passes through a duct 58 that is formed in the fly wheel and its pinion 42 and which duct leads from the corresponding duct 44 to an axial duct 59 that is formed in crank pin 57 and from said axial duct the oil passes through a radial duct 60 that is formed in said crank pin 57 (see Fig. 12).

The outer portions of the rotor plates 51 pass between the packing rings 32 into the circular piston chamber 22 and formed integral with or fixed to each rotor plate is a pair of webs 61 that are positioned in the center of the piston chamber 22 and the members of such pair of webs are arranged diametrically opposite to each other.

A portion of each web 61 projects laterally over the edge of the adjacent rotor plate and formed in the underface of this overlying portion of the web, are short transversely disposed recesses 61ª, which, when filled with oil, provide packed joints between the webs and the peripheral edges of the opposite rotor plates and at the same time this oil lubricates the adjacent bearing surfaces.

Formed integral with the center of each web is a piston 62 corresponding in shape to the cross sectional shape of the piston chamber but having a substantial degree of clearance and each piston is bifurcated or divided by a slot or narrow chamber 63.

Removably arranged within the slot or chamber and positioned adjacent to the edge of the piston, is a piston ring 64 of resilient metal that is substantially channel-shape in cross section and the outer face of which bears with yielding pressure against the inner face of the piston chamber 22.

This piston ring is split in order that it may expand and contract radially and the opening or split in said ring is positioned adjacent to the edge of the rotor plate that carries the piston.

The inwardly presented flanges on the edges of the piston ring gradually decrease in height from that portion of the ring that is positioned immediately adjacent to the outer periphery of the piston chamber, to the ends of said ring and formed integral with the inner edges of said flanges at a point diametrically opposite the split in the ring, is a pair of inwardly presented lips 65.

Arranged within chamber 63 and within the piston ring therein, is a plate 67 that is secured to the piston by bolts 68, and formed through the center of said plate is a slot 69, within which is arranged for sliding movement, a rod 70. The outer end of this rod is provided with a T-shaped head 71 and the lateral projecting portions thereof are positioned between the flanges 65 and the body of rings 64 and after the rod is thus associated with the ring, a small pin 72 is inserted through the outer portion of the rod and the flanges 65. Thus when the ring and rod are properly positioned in chamber 63, said ring and rod are interengaged so that the ring is prevented from circumferential movement within its chamber.

Plate 67 extends to the center of the piston chamber 22 and pivotally mounted on said plate on opposite sides of the center of the piston chamber are short arms 73 carrying on their outer ends counterbalancing weights 74. The inner ends of the said carrying arms 73 are pivotally connected to the inner end of bar 70 and this pivotal connection must necessarily have sufficient play to permit the inner ends of the arms 73 to move through arcs of circles concentric with their fulcrums.

Figure 6:
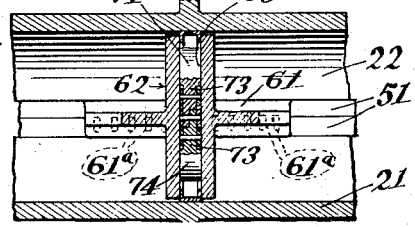
Fig. 6 is a horizontal section taken on the line 6—6 of Fig. 5.
Figure 7:
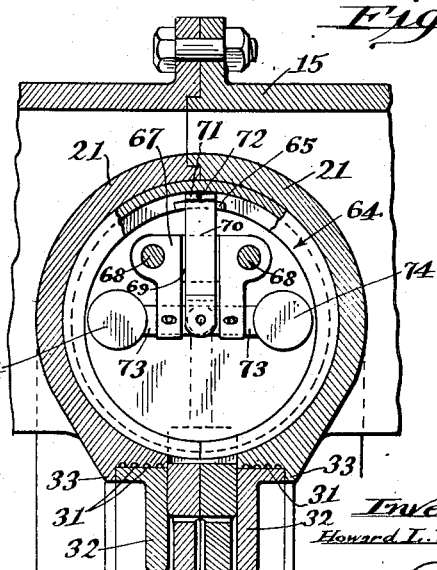
Fig. 7 is an enlarged section taken on the line 7—7 of Fig. 5.

The construction just described and which is illustrated in Figs. 2, 6 and 7, is designed for the purpose of counteracting any tendency of the piston ring 64 to move radially outward under centrifugal force during operation of the engine and which action, in the absence of counterbalancing means, would result in undue friction and wear between the outer portion of the piston ring and the outer portion of the inner surface of the cylinder wall.

Formed through the lower portions of the walls 21 that enclose the piston chamber 22 and disposed approximately 35° apart are openings 75, which function as exhaust ports to permit the escape of products of combustion from the piston chamber 22 and leading from these exhaust openings are exhaust pipes 76 and 77.

A portion of one of these pipes, for instance, the pipe 76, is enlarged in diameter as designated by 78 and the outer portion of exhaust pipe 77 extends for a short distance through this enlarged portion 78, as designated by 79, thereby providing a construction which functions after the manner of an aspirator.

The cross sectional area of the narrow annular space between portion 79 of the exhaust pipe 77 is substantially less than the area of the opening through ports 78 of exhaust pipe 76.

The walls 21 that surround the piston chamber 22, are connected to the outer portions of walls 14 by transversely disposed radial webs or walls 80 and such construction forms to the sides of the circular piston chamber a plurality of pockets 81.

The extreme outer portions of these pockets communicate with each other through relatively narrow openings 82 that are formed through the outer portions of the walls 21 and formed through the outer portions of the walls 14 and communicating with each alternate or second pocket 81, are oil circulation openings 83.

The openings 83 in one plate 14, are staggered or offset with respect to the openings in the opposite plate and thus the oil in circulating between the plates and through the two sets of openings 83, is caused to flow alternately in opposite directions from the pockets on one side to the pockets on the other side and such flow is directly over the walls of the piston chamber with the result that said walls are uniformly and effectively cooled.

Formed integral with the upper portion of each outside plate 12 and on the inner faces thereof, immediately adjacent to the air circulation tubes 16, is a pair of inwardly projecting radially disposed webs 84 and the space between the lower ends of these webs are disposed immediately to the sides of the ports 26 and 29. These webs 84 and the chambers formed by the same are for the purpose of causing that portion of the oil that flows downwardly from the upper portion of the chamber within the engine housing to be directed or flow directly to the ports 26 and 29.

Inasmuch as the air inlet pipes 17 communicate with the circular air ducts 16, at the upper portions thereof, these particular portions will, during engine operation, be constantly receiving cool air and the oil, after flowing in opposite directions over the upper portion of the piston cylinder will pass through the ports 83 and flow over the relatively cool portions of the air circulation tubes 16 and such oil will be cooled by the exchange of heat between the oil and cool air, with the result that the cooled oil will flow downwardly between the webs 84 to discharge through ports 29 and 26.

Thus the oil, after passing over that portion of the annular cylinder in which combustion of the gaseous fuel charges takes place, will flow immediately over those portions of the air circulating tubes 16, that receive the coldest air from the intake and, due to interchange of heat between the oil and air, the heated oil will be rapidly cooled and the cool air will be correspondingly heated and in such condition, said air will be passed to the carburetor.

This exchange of heat between the air that circulates through tubes 16 and the entire volume of liquid lubricant that is caused to circulate over said tubes is highly effective in exerting a cooling effect upon the liquid lubricant and at the same time heating the air, thus equalizing the temperature of the entire volume of liquid lubricant, also equalizing the temperature of the entire engine structure and thereby preventing undue expansion of engine parts in the firing zone of the engine and likewise counteracting tendency of contraction of parts adjacent to the intake zone of the engine.

Located at a point adjacent to the engine and preferably in a plane above the same, is an oil supply and storage tank 85 and leading from the lower portion thereof downwardly to the engine housing, preferably to the chamber between a pair of the webs 84, is an oil delivery pipe 86, and leading from the lower portion of one of the circumferential grooves 30 in the inner face of one of the side walls 14, upwardly to the top of upper portion of tank 85, is an oil duct 88, the oil may be drained from the lower part of the engine housing through a petcock (not shown) or through an opening that is normally closed by a removable plug.

The ignition devices which are illustrated in Figs. 15 to 19, will now be described.

Formed in a thickened portion 89 of each wall 21 and adjacent flange 15, a short distance to one side of the vertical center line of the engine, are small cylindrical chambers 90 and leading downwardly from the intermediate portion of each chamber at a point above the bottom thereof, is a pair of spaced ducts 91, the lower ends of which communicate with the piston chamber 22.

These ducts are arranged so that one duct of each pair is in advance of the other circumferentially of the piston chamber, so that the pistons carried by the rotor plates, pass the inner ends of the ducts 91 in succession.

Mounted for rotation in each chamber 90, is a thimble 92 and the length of each thimble is slightly less than the depth of the chamber 90 so that under all conditions, the bottom of thimble 92 is out of contact with the bottom of said chamber 90.

Formed in the bottom of each recess 90, is an arcuate groove 93 and projecting downwardly from the underface of the thimble into this groove, is a pin 93ª. The length of this groove 93 and the pin projecting thereinto determines the degree of rotary movement that may be imparted to thimble 92.

Formed integral with the intermediate portion of the body of each thimble is a flange 94 that rests on a gasket 95.

Formed in the lower portion of the body of each thimble and leading downwardly from the bottom of chamber 96 therein to the side of the body of the thimble above the lower end thereof, is a pair of apertures 97 that are adapted to register with the upper ends of the corresponding ports 91.

The upper portion of chamber 96 is internally threaded for the reception of the threaded lower portion of a conventional spark plug 98.

The upper portion of each recess 90 above flange 94, is internally threaded for the reception of the externally threaded lower portion of a short collar or ring nut 99 provided on its upper end with wrench faces 100, and this ring nut when tightened, exerts clamping pressure against flange 94 and thereby securely holds the spark plug carrying thimble in its recess. The internal diameter of the ring nut 99 is such that a fairly loose fit is provided between said ring nut and the upper portion of the thimble 92.

When the spark plug is tightly screwed into its thimble 92 and ring nut 99 is loosened, said thimble may be rotated in its chamber so as to bring the ports 97 and 91 into and out of registration by merely rotating the spark plug and which latter, by reason of its engagement with the thimble, rotates the same.

It will be understood that there are two spark plug thimbles 92 and which arrangement provides dual ignition and insures ignition of the gaseous fuel charges within the piston chamber, even when one of the spark plugs ceases to function. Further, by mounting the spark plugs in rotatably arranged thimbles, either one of the latter may be rotated so as to move the openings 97 out of registration with the ports 91, thus enabling either spark plug to be removed and cleaned or changed without affecting the proper functioning of the other plug.

Leading from carburetor X to gaseous fuel inlet ports 102 that enter the piston chamber 22 at a point approximately diametrically opposite to the spark plug 98, are gaseous fuel supply pipes 103.

Figure 4:
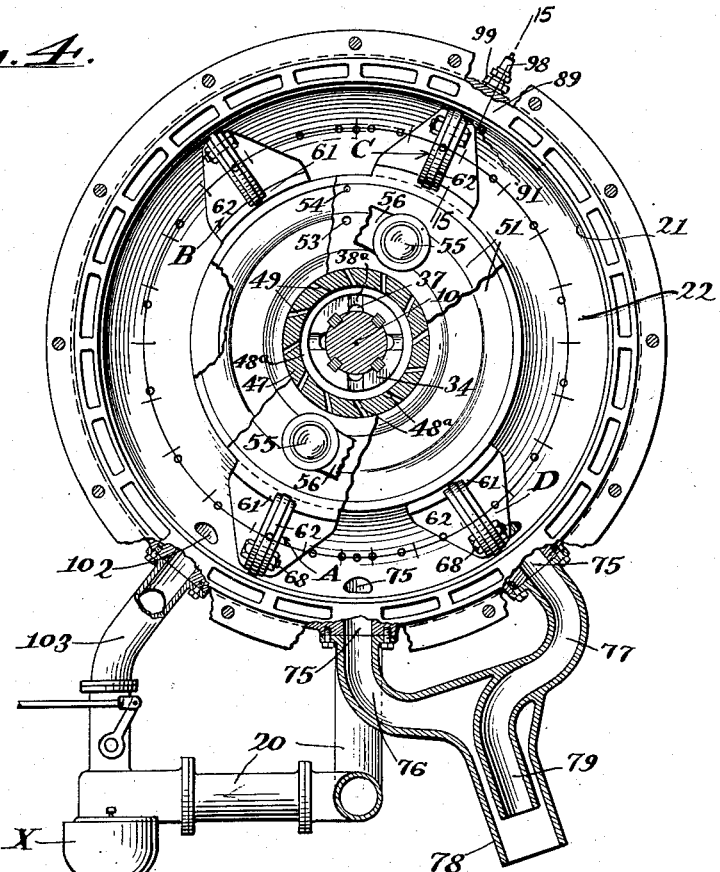
Fig. 4 is a cross section on a reduced scale, on line 4—4 of Fig. 1.
Figure 5:
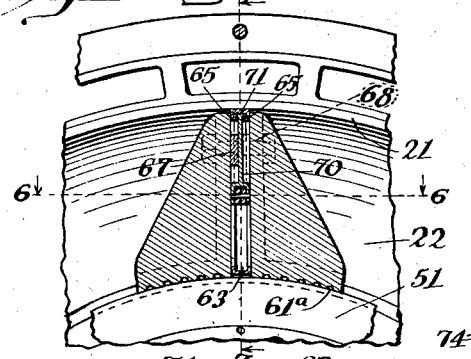
Fig. 5 is a fragmentary detail view of a portion of the cylinder housing and with a piston shown in section within said cylinder.
Figure 8:
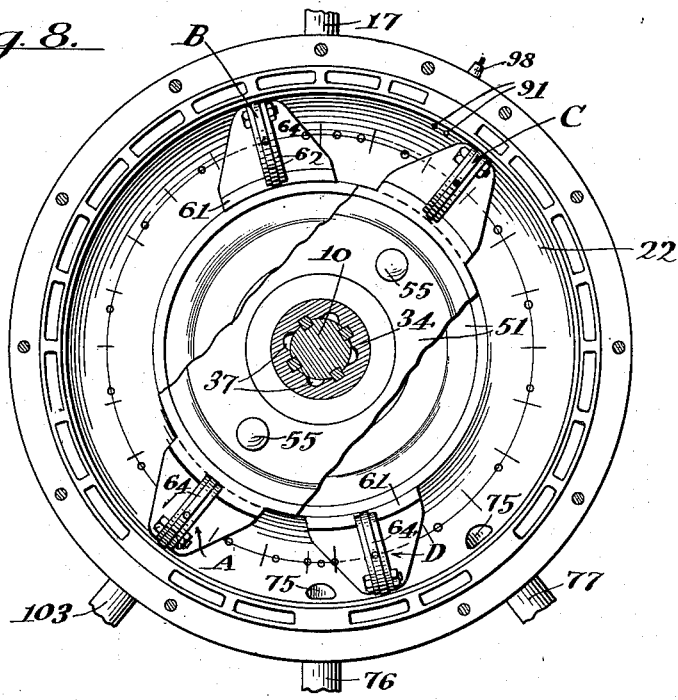
Fig. 8 is a sectional view similar to Fig. 4, but with the pistons in different positions.

The operation of my improved engine is as follows:

The rotor plates and pistons carried thereby always move in the same direction, namely: clock-wise, and in Figs. 4 and 8, I have shown a series of small circles or dots in the piston chamber 23 and these circles or dots represent graphically, the distance of travel of the pistons during each fifteen degrees of rotary movement of the shaft 10. The fifteen degrees travel of the engine shaft is graphically represented by radially disposed lines in the piston chamber 22 in Figs. 4 and 8.

With the four pistons in the positions illustrated in Fig. 4 and said pistons being designated by the letters A, B, C and D, gaseous fuel from carburetor X is flowing through pipe 103 and inlet ports 102 into that portion of the piston chamber between pistons A and B and the gaseous fuel charge previously admitted in front of piston B is being compressed in the upper portion of the piston chamber between pistons B and C.

The gaseous fuel charge previously admitted to the chamber between the pistons C and D and which charge was ignited by a spark produced between the terminals of the spark plugs 98, is under combustion and the resulting expansion has driven piston D forwardly at a greater speed than that of pistons A and C, which latter are connected to the same rotor plate.

As piston D is thus first forced ahead under expansion resulting from combustion of the gaseous fuel charge, piston B, which is carried by the same rotor plate as piston D, will travel forward at greater speed than that of piston C, thereby compressing the gaseous fuel charge between said pistons B and C.

Thus, immediately following expansion of the igniting fuel charges, the two pistons carried by one rotor plate will move at considerably greater speed than the two pistons carried by the other rotor plate and this movement of the pistons which is graphically represented by the circular dots in Figs. 4 and 8, as compared to the fifteen degrees of travel of the engine shaft, produces a variable speed of travel in each of the two rotor plates, with each plate and its pistons moving at increasing or decreasing speed relative to the other plate and its pistons. As one rotor and its pistons increases speed, the other rotor and its pistons decrease in speed and vice versa.

As the rotor plates are thus rotated, the movement thereof through the connecting rods 56 will be transmitted to the small fly wheels 43 and pinions 42 and the latter meshing with ring gears 46, will impart continuous rotary motion to the engine shaft 10.

The relative positions of the connecting rods 56 with respect to each other and with respect to the four pistons of the engine are such that, the greatest degree of leverage of said connecting rods is utilized in the transmission of power to the main fly wheels and the shaft of the engine and which power results from the expansion following combustion of the gaseous fuel charges between the pistons in the piston chamber.

As the piston rings of piston C pass the first ports 91 that lead to the ignition chambers 96, a part of the compressed gaseous fuel charge from the chamber between pistons B and C, will flow upwardly through said first ports 91, thereby expelling from the ignition chambers 96 through the second set of ports 91, or those ports to the rear of the first mentioned ports, any products of combustion that might remain in the ignition chambers, thus completely scavenging said ignition chambers.

Immediately thereafter the piston rings of piston C pass the second set of ports 91 and, at this point the timing apparatus associated with the ignition system produces sparks between the terminals of the spark plugs 98 with the result that compressed gaseous fuel charge between pistons B and C will be ignited. Following combustion and expansion of the charge thus ignited, piston C will be driven forwardly at a much greater speed than that of piston B, and piston A that is carried by the same rotor plate that carries piston C and piston D that is carried by the same rotor plate as piston B, will be correspondingly moved and which movement is graphically illustrated by the circular dots in the piston chambers in Figs. 4 and 8.

As illustrated in Fig. 4, piston D has just moved past the first set of exhaust ports 75, from which leads exhaust pipe 77 and the exhaust gases and products of combustion flow from between pistons C and D outwardly through pipe 77 and discharge therefrom through the outer portion of the larger pipe 78. After piston D passes the second set of exhaust ports 75 to which exhaust pipe 76 is connected, the flow of products of combustion through exhaust pipe 29 will produce suction through pipe 78 so that the latter, together with pipe 79, will function as an aspirator to effect a thorough scavenging of the burnt products of combustion.

Immediately after piston D passes the first set of exhaust ports 75, the exhaust of products of combustion from the chamber between pistons C and D will materially lower the pressure within said chamber and likewise lower the pressure in the spark plug ignition chambers 96 and under such conditions the burnt gases will readily pass from the spark plug ignition chambers and after piston C has passed both sets of ports 91 and the explosive charge between pistons B and C is ignited, piston C will advance at increased speed, due to the timing resulting from the relative arrangement of the wrist pins 55, connecting rod 56 and crank pins 57.

During this scavenging action piston D is moving at less speed than piston A and therefore piston A will pass the gaseous fuel inlet ports 102 before piston D passes the second set of exhaust ports 75 and as piston A passes the inlet ports 102, the fresh gaseous fuel charge entering the chamber between pistons A and D will drive rearwardly through said chamber, any products of combustion that remain therein and such products of combustion will be forced out through the second set of exhaust ports 75 so that the scavenging of the exhaust gases is accomplished forcibly by the comparatively rapid approach of piston D to piston A, also by the aspirator effect produced by the flow of exhaust gases through pipes 78 and 79 and further by the forceful inflow of the fresh gaseous fuel charge admitted, as each piston passes the inlet ports 102.

Whatever relatively small amount of products of combustion that remain between the pistons as they pass the second set of exhaust ports 75, will pass to the rear portion of the chamber between the two pistons so as to hug, or lie immediately adjacent to the trailing piston, with the practically pure gaseous fuel charge occupying the entire forward portion of the piston chamber and under such conditions the gaseous fuel charge will readily ignite when a portion of the charge passes into the ignition chambers at the top of the engine.

It will be understood that a compressed gaseous fuel charge is ignited immediately after each piston passes the ignition chambers at the top of the engine and consequently there are four power impulses produced during each complete rotation of the crank shaft and as a result, a practically continuous flow of power is imparted to the rotors and engine shaft.

The degree of compression of the gaseous fuel charges in my improved engine is relatively small as compared to the compression of gaseous fuel charges in internal combustion engines of the reciprocating type and therefore relatively high or abnormal temperatures are not produced in my improved engine even though four explosions are produced for each rotation of the main engine shaft.

Inasmuch as the operation of the engine develops centrifugal force, any so-called "wet" gas or undissolved particles of liquid hydrocarbon that may pass from the carburetor into the piston chamber will, by such centrifugal force, be thrown outwardly to the outer periphery of the chamber, thus insuring a very rich mixture in that portion of the gas that enters the ignition chambers 96 through ports 91 so that ignition of the gaseous fuel charges is insured.

The comparatively rich mixture in the ignition chambers will ignite readily and the greater portion of the compressed gaseous fuel charge, which lies in the chamber 22 between the pistons and which is comparatively lean, will be ignited to drive the forward one of the two pistons forwardly at increased speed, as hereinbefore described.

By thus taking advantage of the centrifugal force that drives the heavier portions or undissolved particles of liquid hydrocarbon outwardly, and which rich gas passes into the ignition chambers, the engine may be operated economically in point of fuel consumption.

Important features of my invention are, the effective circulation of lubricating oil over all the operating parts of the engine and through all of the bearings thereof and the utilization of the relatively cool air that circulates through the tubes 16 and which exerts cooling effect upon the liquid lubricant so that the entire body of lubricant is constantly maintained at a practically uniform temperature, thereby materially increasing efficiency of engine operation and after the air has circulated through the tubes and cooled the lubricant as the latter flows over the surfaces of said tubes, the air having absorbed heat from the lubricant, is taken directly into the carburetor through the pipes 20 so that during engine operation, the carburetor is constantly supplied with warm air under pressure.

Where my improved engine is utilized on motor vehicles and aircraft, the forward movement of the vehicles or craft will cause relatively cool air to enter pipe 18 and to flow therefrom through branch pipes 17 and this air divides and flows in both directions through the circular pipes 16 in two relatively large streams.

That inasmuch as the pipes 16 are considerably larger than the intake pipe 18, the flow of air through said pipes 16 will be comparatively slow and very little, if any, friction and resulting heat will be developed.

In the event that the engine is operated as a stationary engine, a blower or other suitable means may be utilized for delivering relatively cold air to the circulation pipes 16.

Oil as needed, is delivered into the chamber within the engine housing from supply tank 85.

As a result of centrifugal forces developed by the rotating parts of the engine and particularly the rims of fly wheels 35 and which function as rotary pumps, oil will be thrown outwardly into that portion of the chamber between the walls 14 that is occupied by the pockets 81.

Inasmuch as the ports 83 that are formed through the outer portions of the walls 14 are arranged at the sides of the alternate pockets the oil that passes outwardly through said pockets over the walls 21 of the chamber 22 must necessarily pass in one direction through one pocket and in the opposite direction through the next adjacent pocket, in order to pass to the chambers outside the walls 14 and thus the flow of the oil is divided into portions or streams that are caused to flow simultaneously in opposite directions over the walls of the piston chamber so as to act to the highest possible degree in equalizing the temperature of the entire body of oil.

As the oil passes through ports 83, it passes directly over the surfaces of the air circulation tubes 16, with the result that the oil is materially cooled and the air absorbs heat and from the top of the engine, the cooled oil after passing over the air circulation tubes, passes downwardly through the spaces between the pairs of webs 84 and which latter are for the purpose of directing a portion of the oil into and through ports 29 and 26.

Oil that passes through ports 29 flows directly over the ring gears and the pinions that mesh therewith thereby effect a thorough lubrication and cooling of these parts and the bearings for the pinions 42 and small fly wheels 43, are lubricated and cooled by oil that passes through ducts 40, 39, ports 45 and ducts 44.

Oil for lubricating the bearings between the crank pins 57 and crank arms 56, passes from the ducts 44 through ducts 58, 59 and 60.

Oil that passes through ports 26 enters and passes through the annular ducts 27, from thence through longitudinally disposed ducts 28 and 37 and through ports 48 into groove 48ª in ring 47. This oil flows through the tangential ducts 49 into chamber 52 between the rotor plates 51, thereby effectively lubricating and cooling the latter as well as the packing rings, thereby maintaining same at equal temperature and this oil flows from said chamber 52 outwardly through ports 53 and 54 that are formed in said rotor plates.

Circumferential grooves 50 are filled with oil, thereby providing an effective packing between the rotor plates and the periphery of ring 47 that is clamped between the hubs of the fly wheels or pinion carriers 35 and grooves 31 in the inner edges of the piston chamber walls are filled with oil to provide fluid pressure tight joints between the packing rings and said cylinder walls.

Thus the oil filled grooves 31 prevents the ingress of oil into the piston chamber and at the same time prevents escape of fluid pressure from said piston chamber.

The oil that passes through the different ports 24 in plates 14, is of different temperatures, but such oil will be very rapidly mixed and a uniform temperature established, as the oil is acted upon by the large fly wheels 35 and their flanges 36.

The oil, after passing through ports 24, flows into the annular grooves 25ª and the flanges 25, which overlie said grooves and the openings 24, prevents the fly wheel from producing and exerting back pressure through the ports 24.

The rims of the large fly wheels throw oil radially outward in all directions, thereby effecting a thorough mixture of the oil that passes through ports 24 and consequently equalizing the temperature in such oil.

The oil that passes between the rotors is equalized in temperature and being a cooler oil, materially lowers the temperature in the entire body of oil that is caused to flow through the pockets 81 and over the wall of the piston cylinder, thereby maintaining the latter at a uniform low temperature and such uniform temperature in the oil that functions for cooling purposes as well as for lubricating purposes, provides for an even expansion and contraction of the parts of the engine and consequently prevents uneven distortion of said parts which otherwise would materially affect their efficiency of operation.

The action of the large fly wheels on the body of oil within the engine, produces a certain degree of pressure and such pressure prevents the formation of bubbles of oil and maintains all of the oil in liquid form.

In the event that it is desired to clean or adjust the spark plugs, either one of the two plugs may be easily and quickly removed without affecting the operation of the engine and such removal is done by slightly unscrewing the ring nuts 99 so as to relieve the clamping pressure on flange 94 of thimble 92 so that said thimble may be rotated to move ports 97 in the side thereof, out of registration with the ducts 91 and the plug to be changed, cleaned or adjusted may now be removed from its thimble.

Obviously my improved form of spark plug mounting and the ducts that connect the ignition chambers with the piston chamber are especially applicable to engines of the type to which my invention relates, namely: an internal combustion rotary engine having pistons that traverse a circular chamber, for such construction would not be applicable to internal combustion engines of the reciprocating piston type, as the ignition chamber of the plug could not be scavenged.

Likewise my improved form of piston ring, as illustrated in Fig. 7 can only be used with my improved engine wherein the piston traverses the chamber within an annular cylinder and where the rotation of the rotor plates that carry the pistons and piston rings develop centrifugal forces that tend to move the piston rings outwardly.

The bearing surfaces between the wrist pins 55 and the connecting rods 56, are lubricated by oil that passes through ducts 55ª formed through the rotor plates 51 and thence through circumferential ducts 55ᵇ that are formed in the peripheries of the wrist pins (see Fig. 12).

Oil that enters the grooves 31 in the inner edges of the annular cylinder walls 21, is forcibly retained in said grooves by centrifugal force imparted to the body of oil by the large flywheels 35 and the rims 36 thereof and this oil packing is highly effective in producing a fluid pressure tight joint between the packing rings 32 and the inner edges of the annular cylinder walls.

In my improved engine, the connecting rods 56 that connect the wrist pins 55 on the rotor plates with the crank pins on the small fly wheels 43 and pinions 42, are arranged in front of the axes of the small flywheels and pinions so that when the axes of the crank pins 57 are traveling through their arcs that are farthest away from the axis of the engine shaft, said connecting rods exert pulling strains on said small fly wheels and pinions rather than pushing strains and while the crank pins are traveling through their arcs nearest the axis of the engine shaft, the connecting rods will be pushing on said crank pins and the small fly wheels and pinions, but the leverage exerted by the connecting rods during such pushing strains will be less than the leverage imparted by the connecting rods while the same are exerting pulling strains and which difference of leverage is due to the difference of position of the crank pins with respect to the axis of the engine shaft, while said crank pins are receiving the pulling and pushing strains. As a result of such arrangement, during each power impulse, or during the first portion of the combustion and expansion of the gaseous fuel charge and while the main shaft 10 of the engine is moving approximately 45° of its travel, there has been delivered to said main shaft, approximately two-thirds of the total net stroke produced during each power impulse, with the result that a practically continuous flow of power is imparted to the engine shaft.

When the crank pins 57 are traveling through their arcs that are farthest from the engine shaft, the connecting rods 56 will be exerting their greatest possible degree of leverage in transmitting power from the rotors through the pinions 42 to the fly wheels and consequently to the engine shaft.

Among the particularly desirable features of my invention, are the use of relatively large slow moving air streams for absorbing and equalizing the heat developed in the oil used for lubricating and cooling purposes, the maintenance of practically uniform temperature in all of the oil utilized for lubricating and cooling purposes, thereby equalizing temperatures through the entire engine structure, the constant scavenging of all products of combustion from the annular piston chamber and spark plug ignition chambers and the utilization of developed centrifugal forces for the most effective handling or positioning of the gaseous fuel that enters the engine and particularly the richest or the more readily ignitable portion of said gaseous fuel.

It will be understood that minor changes in the size, form and construction of the various parts of my improved internal combustion rotary engine may be made and substituted for those herein shown and described without departing from the spirit of the invention, the scope of which is set forth in the appended claims.

I claim as my invention:

1. In an internal combustion rotary engine, a housing having an annular cylinder, a shaft journaled in said housing, a pair of rotor plates mounted for independent rotation within said housing, pistons carried by said rotor plates, which pistons occupy the chamber within said annular cylinder, means for igniting gaseous fuel charges in the annular chamber between said pistons, driving connections from said rotor plates to said shaft, a pair of oil circulation chambers formed within the housing to the sides of said annular cylinder, an air circulation tube arranged within each of said oil circulation chambers and disposed substantially parallel with the annular cylinder, a common air intake connected to the upper portions of said air circulation tubes and means whereby liquid lubricant is caused to circulate through said oil circulation chambers and over said air circulation tubes to effect an exchange of heat between said liquid lubricant and said air and equalize the temperature in the entire volume of circulated liquid lubricant and said engine.

2. In an internal combustion rotary engine, a housing having an annular cylinder and an oil circulation chamber that surrounds said annular cylinder, a shaft journaled in said housing, a pair of rotor plates arranged for independent rotary movement within said housing, a pair of pistons carried by each rotor plate and positioned within the chamber in the annular cylinder, driving connections between each rotor plate and said shaft, which driving connections occupy the oil chamber within said housing, a pair of air circulation tubes disposed within said housing on opposite sides and substantially parallel with said annular cylinder and means for conveying atmospheric air through the oil circulation chamber for the purpose of effecting an exchange of heat between the liquid lubricant and the air to equalize the temperature of the entire body of lubricant within the engine.

3. An internal combustion rotary engine as set forth in claim 2, and with means to circulate oil from the oil chamber within said housing over said air circulation tubes.

4. An internal combustion rotary engine as set forth in claim 2 and with means to circulate oil from the oil chamber within the housing over the annular cylinder and then over the air circulation tubes.

5. An internal combustion rotary engine as set forth in claim 2 and with means to circulate the body of oil within the oil circulation chamber and flow in alternate streams in opposite directions across the annular cylinder wall and thence over the air circulation tubes.

6. In an internal combustion rotary engine, a housing provided with an annular cylinder, a shaft journaled in said housing, a ring mounted to rotate freely upon said shaft, which ring is provided with oil circulation ducts, a pair of rotor plates mounted for independent rotary movement upon said ring, pistons carried by said rotor plates and positioned in the chamber within said annular cylinder, driving connections between said rotor plates and said shaft, portions of which rotor plates are spaced apart to form a narrow chamber that is in communication with certain of the oil circulation ducts in said ring and means for causing a forcible flow of oil through the oil circulation ducts in said ring and through said chamber.

7. In an internal combustion rotary engine, a housing having an annular cylinder, a pair of rotor plates mounted for independent rotary movement within said housing, pistons carried by said rotor plates, which pistons occupy the chamber in said annular cylinder, a split piston packing ring removably arranged in each piston and means detachably connected to said ring at a point diametrically opposite the split therein and actuated by centrifugal force developed during operation of the rotor plate and piston for counteracting tendency of the piston ring to move radially outward.

8. In an internal combustion rotary engine, a housing having an annular cylinder, a pair of rotor plates mounted for independent rotary movement within said housing, pistons carried by said rotor plates, which pistons occupy the chamber in said annular cylinder, a split piston packing ring removably arranged in each piston and a pair of counterbalancing weights associated with each piston and its ring and pivotally connected to said ring at a point diametrically opposite the split therein for counteracting tendency of the ring to move radially outward under centrifugal force.

9. In an internal combustion rotary engine, a housing having an annular cylinder, a shaft journaled in said housing, a pair of rotor plates mounted for independent rotation within said housing, pistons carried by said rotor plates, which pistons occupy the annular cylinder, means for igniting gaseous fuel charges in the annular cylinder between said pistons, driving connections from said rotor plates to said shaft, means for circulating oil over said annular cylinder, oil circulation chambers formed in the housing to the sides of said annular cylinder, said oil circulation chambers being in communication with the chamber that is occupied by the annular cylinder, air circulation tubes arranged within said oil circulation chambers and disposed substantially parallel with the annular cylinder, a common air inlet connected to the upper portions of said air circulation tubes, means for circulating oil through said oil chambers and over the air circulation tubes therein and means for conducting the coldest portion of said oil to the bearings and operating parts within the engine that require lubrication.

10. In an internal combustion rotary engine, a housing having an annular cylinder, a shaft journaled in said housing, a pair of rotor plates mounted for independent rotation within said housing, pistons carried by said rotor plates, which pistons occupy the chamber within said annular cylinder, means for igniting gaseous fuel charges in the annular cylinder between said pistons, driving connections from said rotor plates to said shaft, a pair of oil circulation chambers formed within the housing to the sides of the chamber occupied by the annular cylinder, which oil circulation chambers are in communication with the chamber occupied by said cylinder, air circulation tubes arranged in said oil circulation chambers and arranged substantially parallel with said annular cylinder, a common air inlet pipe connected to the upper portions of said air circulation tubes, means for effecting a circulation of oil through said oil chambers and over said air circulation tubes and said annular cylinder, and means for combining those portions of the oil having different temperatures so as to produce oil of uniform temperature and delivering same over the annular cylinder.

11. In an internal combustion rotary engine, an annular cylinder provided with inlet and exhaust ports, pistons adapted to traverse the chamber within said annular cylinder, means for igniting the gaseous fuel charges delivered through the inlet ports into the combustion chamber between two of said pistons and cooperating means for developing combined pressure and suction for scavenging the burnt gases and products of combustion from said annular cylinder.

12. In an internal combustion rotary engine, a housing having a chamber, an annular cylinder within said chamber, said housing having oil circulation chambers to the sides of the chamber that contains said cylinder, a shaft journaled in said housing, a pair of rotor plates mounted for independent rotation upon said shaft, pistons carried by said rotor plates, which pistons occupy the annular cylinder, means for ignited gaseous fuel charges in the annular cylinder between said pistons, driving connections from said rotor plates to said shaft and means whereby oil within the housing is caused to flow over the annular cylinder and thence into and through the oil circulation chambers that are located to the sides of the chamber that is occupied by the annular cylinder.

13. In an internal combustion rotary engine, a housing, partitions arranged within said housing for dividing the space therein into three chambers, an annular cylinder located in the central chamber, a shaft journaled in said housing, a pair of rotor plates mounted for independent rotation within said housing, pistons carried by said rotor plates, which pistons occupy the annular cylinder, means for igniting gaseous fuel charges in the annular cylinder between said pistons, driving connections from said rotor plates to said shaft and means including openings formed through the outer and inner portions of said partitions for causing oil within the housing to circulate over the annular cylinder and thence into and through the chambers to the sides of the chamber that is occupied by said annular cylinder.

14. In an internal combustion rotary engine, a housing, partitions arranged within said housing for dividing the space therein into three chambers, an annular cylinder occupying the central one of said chambers, a shaft journaled in the housing, rotor plates mounted for independent rotation on said shaft, pistons carried by said rotor plates, which pistons occupy the annular cylinder, means for igniting gaseous fuel charges in the annular cylinder between the pistons, driving connections from the rotor plates to said shaft, radially disposed walls arranged between the annular cylinder and the outer portions of the partitions in said housing and the outer and inner portions of said partitions being provided with openings to permit circulation of oil from the chamber occupied by the annular cylinder to and through the other chambers within said housing.

15. In an internal combustion rotary engine, a housing, partitions within said housing for dividing the space therein into three chambers, an annular cylinder located in the central one of said chambers, a shaft journaled in the housing, a pair of rotor plates mounted for independent rotation on said shaft, pistons carried by said rotor plates, which pistons occupy the annular cylinder, means for igniting gaseous fuel charges in the annular cylinder between said pistons, driving connections from said rotor plates to said shaft, radially disposed walls between the annular cylinder and the outer portions of said partitions and housing, there being openings formed in the partitions between the outer portions of said radial walls and there being openings formed through said partitions adjacent the shaft whereby oil within the housing is caused to circulate over the annular cylinder, thence to and through the chambers to the sides of the chamber that is occupied by said annular cylinder.

16. In an internal combustion rotary engine, a housing having an annular cylinder, pistons adapted to traverse the chamber within said annular cylinder, a piston ring carried by each piston, an ignition chamber formed in that portion of the wall of the annular cylinder beyond that portion of the cylinder chamber having the greatest diameter and ducts leading from said ignition chamber to the chamber within the annular cylinder, which ducts are positioned one in advance of the other, circumferentially of the annular cylinder, with the ends of said ducts that communicate with the annular cylinder spaced a greater distance apart than the width of the ring carried by each piston.

17. In an internal combustion rotary engine, a housing having an annular cylinder, pistons adapted to traverse the chamber within said annular cylinder, a piston ring carried by each piston, an ignition chamber formed in that portion of the wall of the annular cylinder beyond that portion of the cylinder chamber having the greatest diameter and ducts leading from said ignition chamber to the chamber within the annular cylinder, which ducts are positioned one in advance of the other, circumferentially of the annular cylinder with the ends of the ducts that communicate with the chamber in the annular cylinder located adjacent the line of greatest diameter of the chamber within said annular cylinder.

18. In an internal combustion rotary engine, an annular cylinder, pistons arranged to traverse the chamber within said annular cylinder, a packing ring carried by each piston, an ignition chamber formed in that portion of the wall of the cylinder beyond that portion of the cylinder chamber having the greatest diameter, a pair of ducts leading from the ignition chamber to the chamber within the annular cylinder, the distance between the ends of the ducts that communicate with the chamber in the cylinder being greater than the width of the packing ring carried by the piston and the ends of the ducts that communicate with the chamber in the cylinder being located adjacent to the line of greatest circumference of the chamber in said annular cylinder.

19. In an internal combustion rotary engine, a housing having an annular cylinder, pistons adapted to traverse the chamber within said annular cylinder, a piston ring carried by each piston, an ignition chamber formed in that portion of the wall of the annular cylinder beyond that portion of the cylinder chamber having the greatest diameter, ducts leading from said ignition chamber to the chamber within the annular cylinder, the distance between the ends of the ducts that communicate with the chamber in the cylinder being greater than the width of the packing ring carried by the piston and means within said ignition chamber for closing said ducts.

HOWARD L. WEED.